(12) United States Patent
Huang

(10) Patent No.: US 11,992,152 B2
(45) Date of Patent: May 28, 2024

(54) ROTISSERIE GRILL

(71) Applicant: ZHUHAI FEILONG ELECTRIC APPLIANCE CO., LTD., Guangdong (CN)

(72) Inventor: Chaolong Huang, Zhuhai (CN)

( * ) Notice: Subject to any disclaimer, the term of this patent is extended or adjusted under 35 U.S.C. 154(b) by 556 days.

(21) Appl. No.: 17/277,268

(22) PCT Filed: Nov. 1, 2018

(86) PCT No.: PCT/CN2018/113249
§ 371 (c)(1),
(2) Date: Mar. 17, 2021

(87) PCT Pub. No.: WO2020/056861
PCT Pub. Date: Mar. 26, 2020

(65) Prior Publication Data
US 2021/0353098 A1 Nov. 18, 2021

(30) Foreign Application Priority Data
Sep. 18, 2018 (CN) .......................... 201821529551.7

(51) Int. Cl.
*A47J 37/04* (2006.01)
*A47J 37/06* (2006.01)

(52) U.S. Cl.
CPC .......... *A47J 37/042* (2013.01); *A47J 37/0635* (2013.01)

(58) Field of Classification Search
CPC .............................. A47J 37/042; A47J 37/0635
(Continued)

(56) References Cited

U.S. PATENT DOCUMENTS

| 7,921,768 B2 * | 4/2011 | Fernandez | .......... A47J 37/0629 99/421 A |
| 2018/0195732 A1 * | 7/2018 | Drummond | ......... A47J 37/0704 |

FOREIGN PATENT DOCUMENTS

| CN | 101015425 A | * | 9/2007 | .......... A47J 37/0709 |
| CN | 107951407 B | * | 4/2018 | .......... A47J 37/0629 |
| KR | 102233397 | * | 8/2016 | .......... A47J 37/0709 |

OTHER PUBLICATIONS

Machine Translation of CN107951407B (Year: 2023).*
Machine Translation of CN101015425A (Year: 2023).*
Machine Translation of KR102233397 (Year: 2023).*

* cited by examiner

*Primary Examiner* — Nathaniel E Wiehe
*Assistant Examiner* — Thomas J Ward
(74) *Attorney, Agent, or Firm* — InHouse Co. Law Firm; Theodore S. Lee, Esq.

(57) ABSTRACT

The present invention discloses a rotisserie grill. The rotisserie grill includes a rotisserie grill body (1), an electric controller, a spit rod (8), and a motor. The rotisserie grill body (1) defines a heating cavity (100) having an upper opening. The heating cavity (100) is provided with vertically arranged heating tubes (2) and reflecting plates (3) on both sides thereof. The rotisserie grill body (1) has air intake holes (18) at a bottom portion thereof, the air intake holes (18) leading into a cavity between vertical inner and outer plates of the rotisserie grill body (1). The spit rod (8) includes an inserting rod (80), a handle (81), and a positioning piece (82). The rotisserie grill body (1) is provided with a quick connector (18) at a front end, and a groove (16) at a rear end. A front end of the inserting rod is detachably connected to an output end of the motor via the quick connector (18). A rear end of the inserting rod is connected to the handle (81) and overlaps with the groove (16). The (Continued)

positioning piece (82) and the handle (81) axially limit the inserting rod (80). The motor drives the inserting rod (8) and food thereon to rotate. The reflecting plates (3) directly reflect the heat of the heating tubes (2) and direct the heat to the food on the inserting rod (8) to implement an automatic rotating and high efficiency roasting mode.

8 Claims, 10 Drawing Sheets

(58) Field of Classification Search
 USPC ..................................................... 99/421 H
 See application file for complete search history.

ROTISSERIE GRILL

TECHNICAL FIELD

The present invention relates to a rotisserie grill.

BACKGROUND ART

A roaster is a kitchen electric appliance which is used for roasting food by consuming electric energy and converting the electric energy into thermal energy. There are various electric appliances like roasters in the related art that heat food and each of them have their own advantages and disadvantages. General disadvantages of these electric appliances are poor multi-function performance, large size, low heating efficiency, slow heating, and the like. Electric food heating appliances in the related art, especially barbecue appliances, cannot change food placement and heating modes according to specific shapes and features of food when heating the food. For example, the food can only be heated in a single mode of laying the food flat or hanging the food. At present, there is no domestic roaster for roasting poultry such as chickens and ducks in an automatic rotating mode. Therefore, a scope of use of such a domestic roaster is limited.

The temperature in a heating cavity of the roaster in the related art can reach about 240 degrees Celsius under normal indoor temperature when heating and roasting food. The temperature of an outer surface (also known as a "cold surface") of the roaster body that is most easily accessible to consumers can exceed 100 degrees Celsius, and a highest value can even exceed 150 degrees Celsius, which poses a safety hazard for burns. Some countries or organizations (such as the European Union) have adopted mandatory requirements for this safety issue to limit the working temperature of the cold surface. Therefore, the roaster in the related art has a defect that the surface temperature is excessively high, which leads to a relatively large safety hazard and is difficult to satisfy relevant safety standards.

SUMMARY OF THE INVENTION

A technical problem to be solved by the present invention is to overcome shortcomings in the related art and provide a rotisserie grill with high heating efficiency, energy saving, and capable of roasting in an automatic rotating mode.

A technical scheme adopted by the present invention is as follows. The present invention includes a rotisserie grill body, an electric controller, a spit rod, and a motor. The rotisserie grill body defines a heating cavity having an upper opening. The heating cavity is provided with a detachable residue receiving tray at a bottom portion thereof. The heating cavity is provided with, on both sides thereof, a pair of vertically arranged heating tubes and a pair of reflecting plates that reflect heat from the heating tubes into the heating cavity. The rotisserie grill body has a plurality of air intake holes at a bottom portion thereof, the plurality of air intake holes leading into a cavity between vertical inner and outer plates of the rotisserie grill body. The spit rod includes an inserting rod, a handle, and a positioning piece. The rotisserie grill body is provided with a quick connector on an inner plate at a front end, and a groove on each of inner and outer plates at a rear end. A front end of the inserting rod is detachably connected to an output end of the motor via the quick connector. A rear end of the inserting rod is connected to the handle and overlaps with the groove. The positioning piece and the handle are respectively located on two sides of the inner and outer plates at the rear end of the rotisserie grill body to axially limit the inserting rod. The motor drives the inserting rod and food thereon to rotate. The reflecting plates directly reflect the heat of the heating tubes and direct the heat to the food on the inserting rod to implement an automatic rotating and high efficiency roasting mode.

The cavity between the vertical inner and outer plates of the rotisserie grill body includes a hot air passage close to the heating cavity and the reflecting plate, and a cold air duct close to an outer wall of the rotisserie grill body. The hot air passage has a plurality of backflow holes on a top portion, the plurality of backflow holes communicating with the heating cavity so that high-temperature air in the hot air passage flows back into the heating cavity. The cold air duct has a plurality of exhaust holes on a top portion, the plurality of exhaust holes communicating with outside to discharge low-temperature air in the cold air duct and reduce temperature of the outer wall of the rotisserie grill body.

A heat insulation cavity is further provided between the hot air passage and the cold air duct. The heat insulation cavity isolates the high-temperature air and the low-temperature air of the hot air passage and the cold air duct. The heat insulation cavity is a closed cavity.

A front cavity and a rear cavity are respectively provided between inner and outer plates at front and rear ends of the rotisserie grill body to thermally isolate the front and rear ends of the heating cavity from the outside.

A plurality of air passage holes are provided on a region of the inner plates at both ends of the rotisserie grill body that corresponds to the cold air duct, so that the front cavity and the rear cavity are communicated with the cold air duct.

The reflecting plate is provided with a transparent glass cover plate at the opening to close the reflecting plate and obtain a reflecting cavity.

The rotisserie grill further includes a grill. The grill is provided with mesh holes, and a handle at both ends. The rotisserie grill body is provided with a foot pad at four corners, and the grill is configured to be disposed on the foot pad to roast food on the grill.

The rotisserie grill further includes a cover door. The cover door includes a glass cover and a bead fixed on one side of the glass cover. Both ends of the bead are provided with a shaft hole. A pair of door shafts face each other at two ends of a top portion of the rotisserie grill body. The shaft hole is matched and connected with the door shaft. When the cover door is closed, a top portion of the heating cavity is closed to prevent direct heat loss.

The rotisserie grill further includes a bakeware. The bakeware is configured to be disposed on a top portion of the heating cavity to close the heating cavity to cook food on the bakeware.

The rotisserie grill further includes two baffles. The baffles are detachably arranged vertically at positions between the backflow holes and the exhaust holes on the rotisserie grill body, so that when the cover door is closed, two sides of the cover door and the heating cavity are closed.

The cover door includes a handle.

The cover door is arched.

Beneficial effects of the present invention are as follows. The present invention includes a rotisserie grill body, an electric controller, a spit rod, and a motor. The rotisserie grill body defines a heating cavity having an upper opening. The heating cavity is provided with a detachable residue receiving tray at a bottom portion thereof. The heating cavity is provided with, on both sides thereof, a pair of vertically arranged heating tubes and a pair of reflecting plates that reflect heat from the heating tubes into the heating cavity.

The rotisserie grill body has a plurality of air intake holes at a bottom portion thereof, the plurality of air intake holes leading into a cavity between vertical inner and outer plates of the rotisserie grill body. The spit rod includes an inserting rod, a handle, and a positioning piece. The rotisserie grill body is provided with a quick connector on an inner plate at a front end, and a groove on each of inner and outer plates at a rear end. A front end of the inserting rod is detachably connected to an output end of the motor via the quick connector. A rear end of the inserting rod is connected to the handle and overlaps with the groove. The positioning piece and the handle are respectively located on two sides of the inner and outer plates at the rear end of the rotisserie grill body to axially limit the inserting rod. The motor drives the inserting rod and food thereon to rotate. The reflecting plates directly reflect the heat of the heating tubes and direct the heat to the food on the inserting rod to implement an automatic rotating and high efficiency roasting mode. By arranging the reflecting plates and the spit rod in the heating cavity, the reflecting plates directly reflect the heat of the heating tubes to the food on the spit rod. In the present invention, the heat can be focused, the heating efficiency is high, waste of heat energy is avoided, the energy is saved, and the function of automatically rotating and roasting in the heating cavity is implemented. Therefore, the present invention has advantages of high heating efficiency and energy saving, and can roast food in the automatic rotating mode.

DESCRIPTION OF THE EMBODIMENTS

First Embodiment

Figure 1:
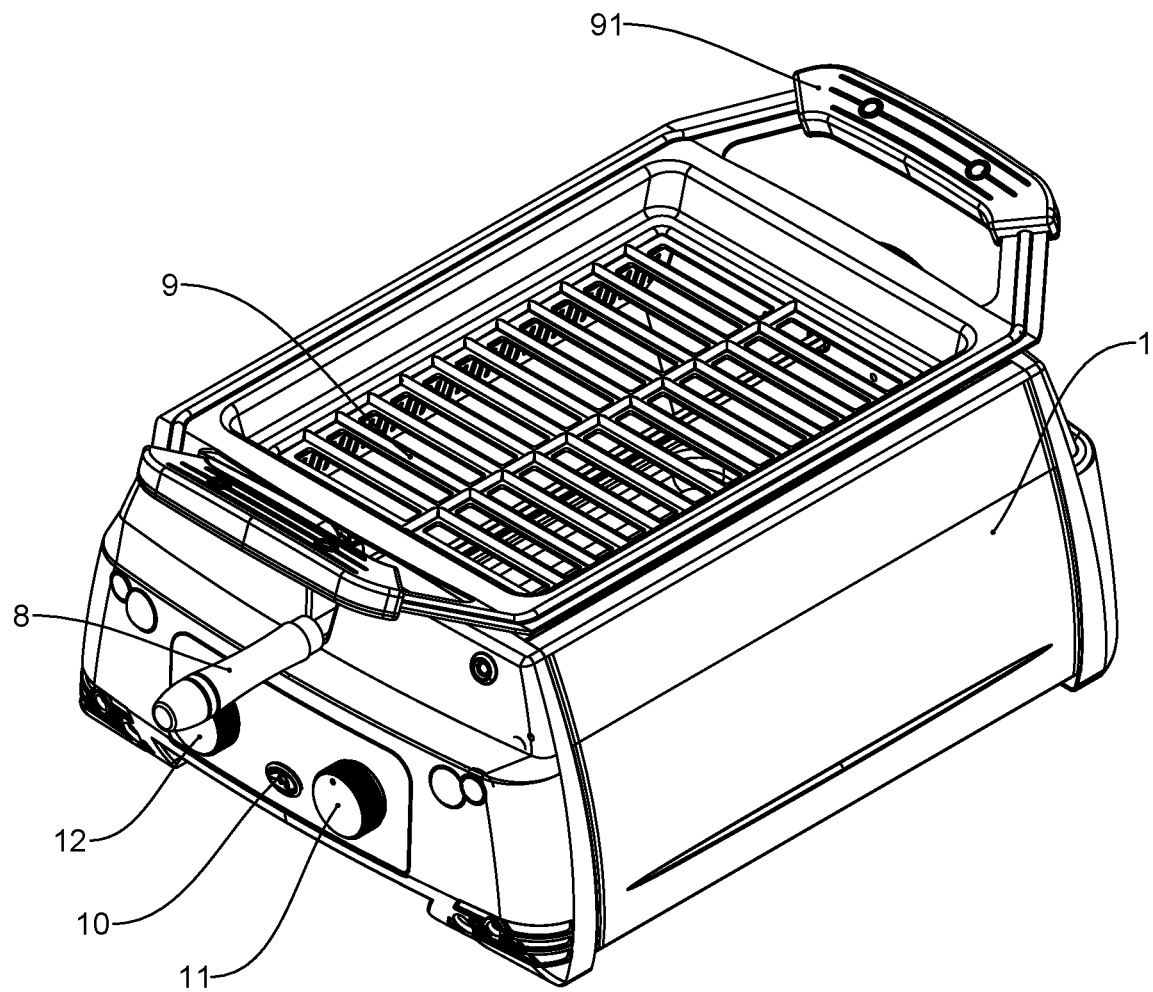
FIG. 1 is a schematic view of an overall structure of a first embodiment of the present invention.
Figure 2:
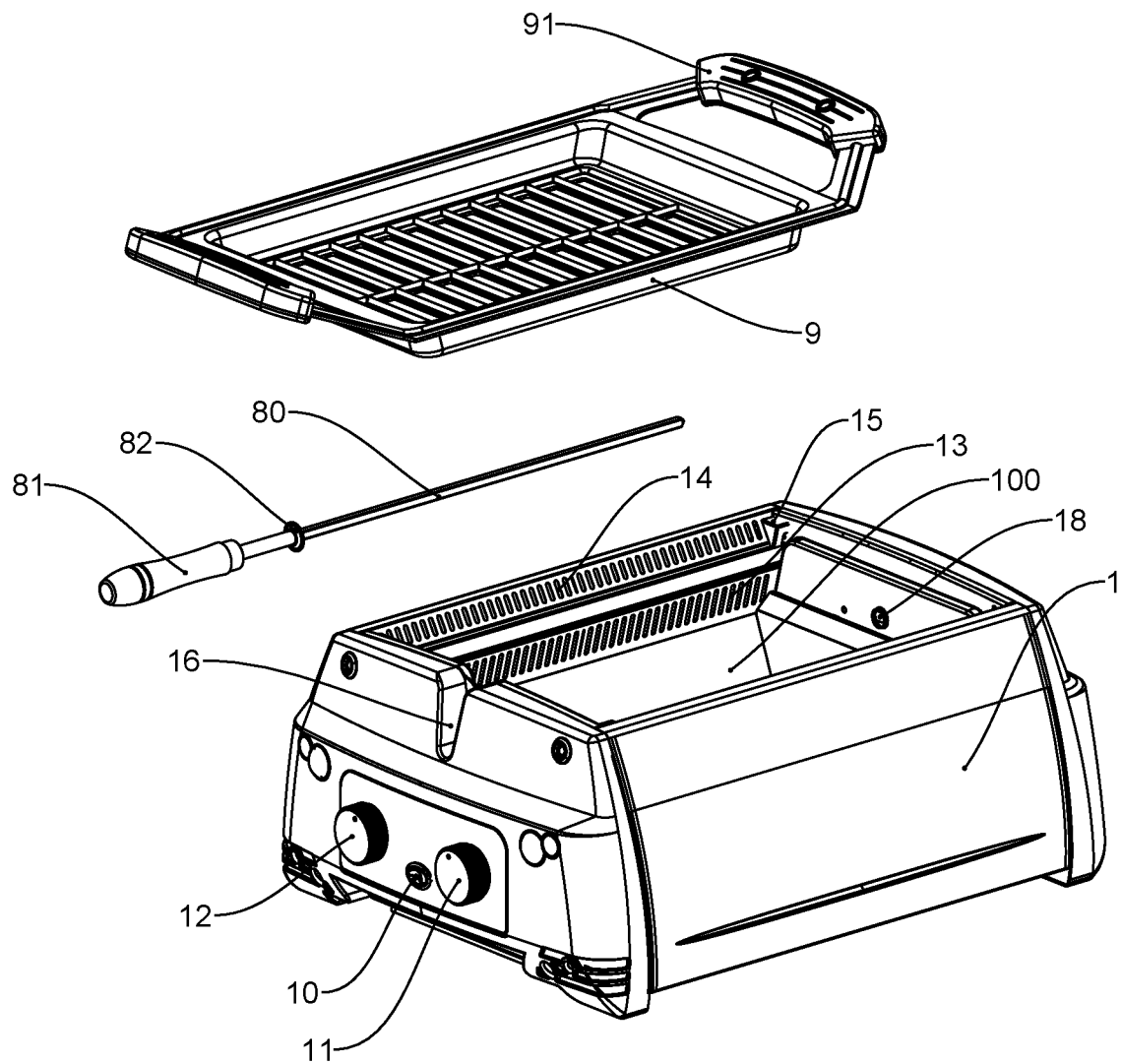
FIG. 2 is a schematic view of an exploded structure of the first embodiment of the present invention.
Figure 3:
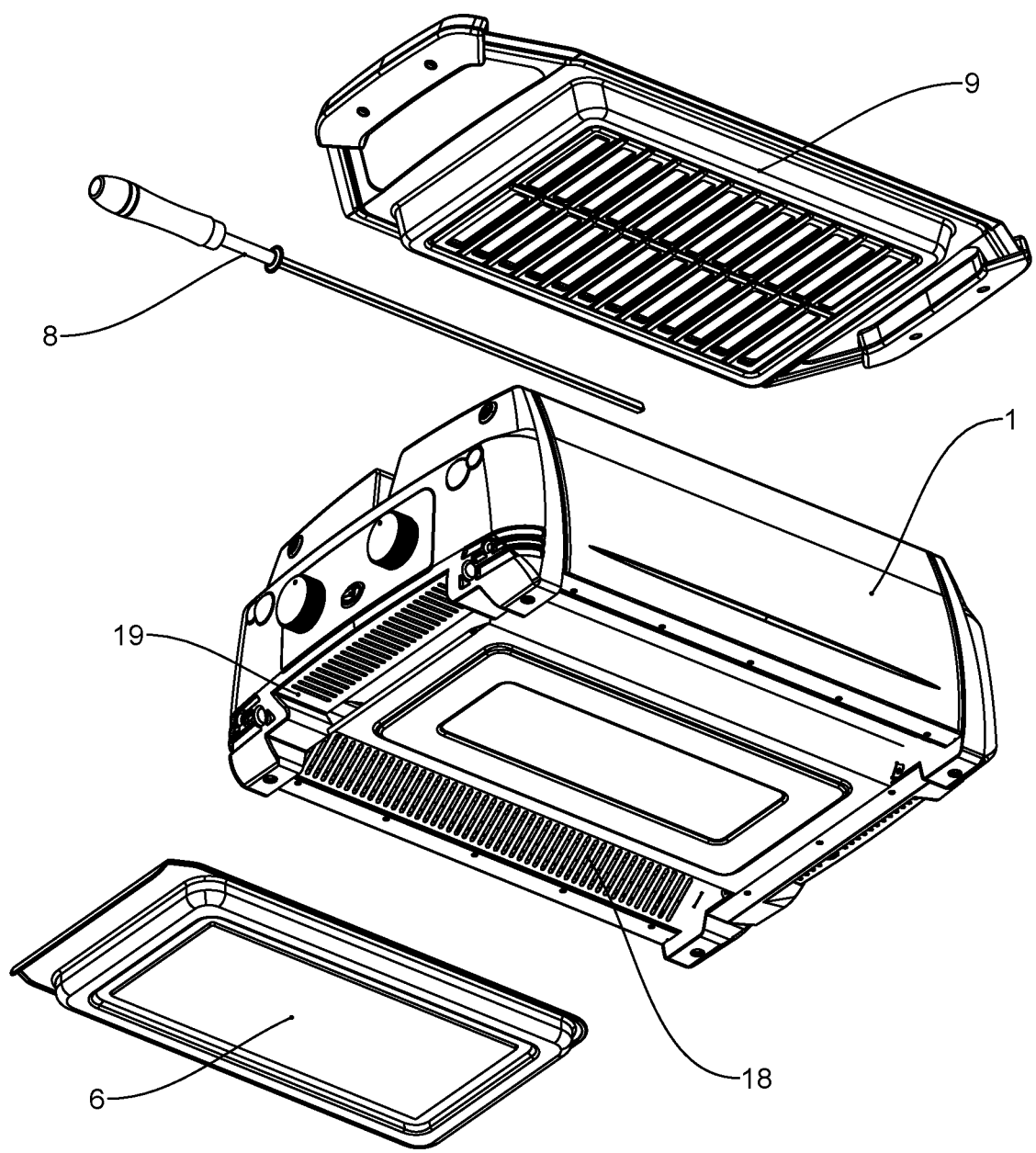
FIG. 3 is a schematic view of the exploded structure from another angle of the first embodiment of the present invention.
Figure 4:
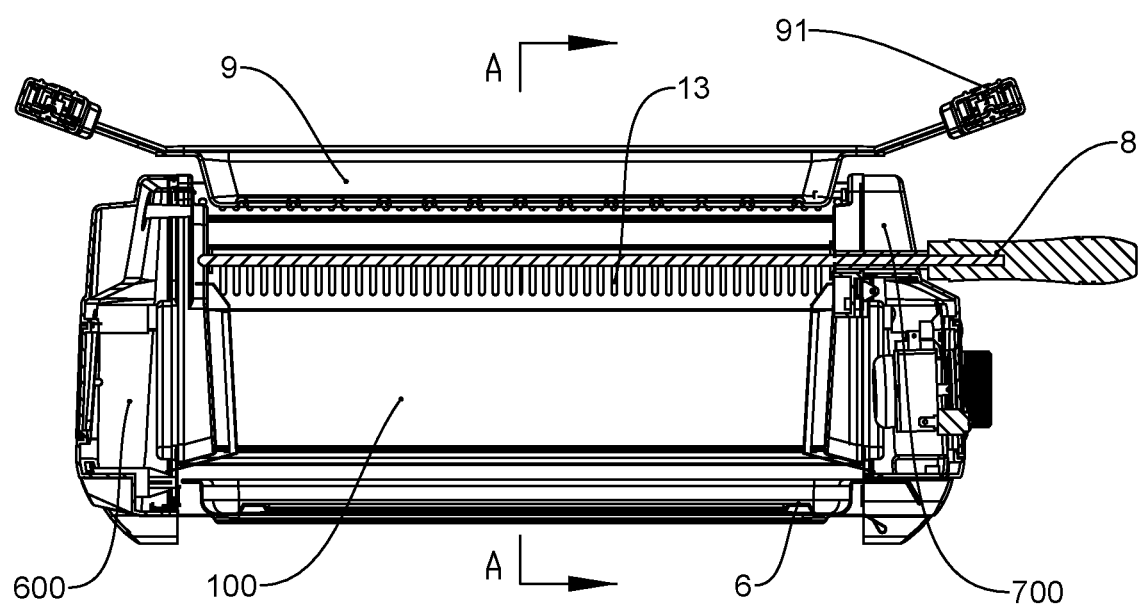
FIG. 4 is a schematic view of a vertical cross-sectional structure of the first embodiment of the present invention.
Figure 5:
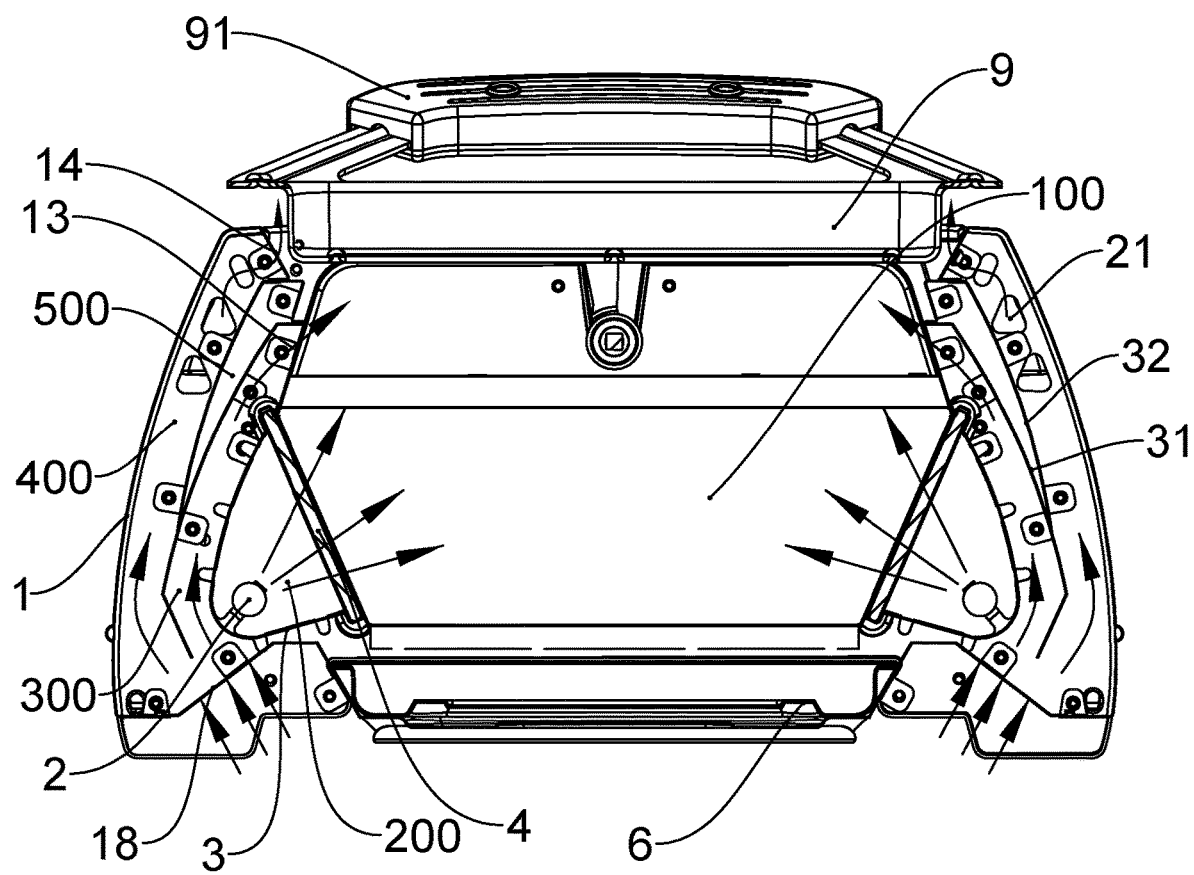
FIG. 5 is a schematic view of a cross-sectional structure along A-A shown in FIG. 4.

As shown in FIGS. 1 to 5, a rotisserie grill according to the present embodiment includes a rotisserie grill body 1, an electric controller, a spit rod 8, and a motor. The rotisserie grill body 1 defines a heating cavity 100 having an upper opening. The heating cavity 100 is provided, at a bottom portion, with a detachable residue receiving tray 6 configured to receive food residues or particles dropping when processing food. The rotisserie grill body 1 is provided, at a bottom portion, with a vertical slot 19 into which the residue receiving tray 6 is inserted. The electric controller includes a switch 10, a thermostat 11, and a timer 12. The switch 10 in the present embodiment is a boat-shaped switch. The thermostat 11 and the timer 12 are mechanical knobs. The heating cavity 100 is provided with, on both sides thereof, a pair of vertically arranged heating tubes 2 and a pair of reflecting plates 3 that reflect heat from the heating tubes 2 into the heating cavity 100. The reflecting plate 3 is provided with, at an opening thereof, a transparent glass cover plate 4 to close the reflecting plate 3 and obtain a reflecting cavity 200. The transparent glass cover 4 not only allow reflected light waves to pass through, but also can isolate the heating cavity 100, and can also prevent the reflecting cavity 200, the heating tube assembly 2, and the reflecting plate 3 from being polluted. The rotisserie grill body 1 has a plurality of air intake holes 18 at the bottom portion. The plurality of air intake holes 18 lead into a cavity between vertical inner and outer plates of the rotisserie grill body 1. The spit rod 8 includes an inserting rod 80, a handle 81, and a positioning piece 82. The rotisserie grill body 1 is provided with a quick connector 18 on an inner plate at a front end, and a groove 16 on each of inner and outer plates at a rear end. A front end of the inserting rod is detachably connected to an output end of the motor via the quick connector 18. A rear end of the inserting rod is connected to the handle 81 and overlaps with the groove 16. The positioning piece 82 and the handle 81 are respectively located on two sides of the inner and outer plates at the rear end of the rotisserie grill body 1 to axially limit the inserting rod 80. The motor drives the inserting rod 8 and food thereon to rotate. The reflecting plates 3 directly reflect the heat of the heating tubes 2 and direct the heat to the food on the inserting rod 8, thereby implementing an automatic rotating and high efficiency roasting mode. The cavity between the vertical inner and outer plates of the rotisserie grill body 1 includes a hot air passage 300 close to the heating cavity 100 and the reflecting plate 3, and a cold air duct 400 close to an outer wall of the rotisserie grill body 1. The hot air passage 300 has a plurality of backflow holes 13, which communicate with the heating cavity 100, on a top portion thereof so that high-temperature air in the hot air passage 300 flows back into the heating cavity 100. The cold air duct 400 has a plurality of exhaust holes 14, which communicate with outside, on a top portion thereof to discharge low-temperature air in the cold air duct 400 and reduce the temperature of the outer wall of the rotisserie grill body 1. In the present embodiment, a heat insulation cavity 500 is also provided between the hot air passage 300 and the cold air duct 400. The heat insulation cavity 500 isolates the high-temperature air and the low-temperature air of the hot air passage 300 and the cold air duct 400. The heat insulation cavity 500 is a closed cavity. A front cavity 600 and a rear cavity 700 are respectively provided between inner and outer plates at front and rear ends of the rotisserie grill body 1 to thermally isolate the front and rear ends of the heating cavity 100 from the outside, further enhance heat insulation effect, prevent heat loss, and avoid excessive surface temperature. A plurality of air passage holes 21 are provided on a region of the inner plates at both ends of the rotisserie grill body 1 that corresponds to the cold air duct 400, so that the front cavity 600 and the rear cavity 700 are communicated with the cold air duct 400 to form a three-dimensional heat insulation system around the heating cavity 100. The rotisserie grill further includes a grill 9. The grill 9 is provided with mesh holes, and handles 91 at both ends. Four corners of the rotisserie grill body 1 are provided with foot pads 15, and the grill 9 can be disposed on the foot pads 15 to roast the food on the grill 9. The food can be a variety of vegetables and meet. In the present embodiment, the heat comes from the heating tubes 2 and is reflected by the reflecting plates 3. When the natural air temperature outside is 25 degrees Celsius, tested temperature in the reflecting cavity 200 can reach 500 degrees Celsius; temperature in the heating cavity 100 can reach about 230 degrees Celsius; temperature of the high-temperature air in the hot air passage 300 and air flowing back into the heating cavity 100 via the hot air passage can reach about 230 degrees Celsius; temperature in the heat insulation cavity 500 is about 150 degrees Celsius; and temperature of the low-temperature air in and discharged through the cold air duct 400 is about 90 degrees Celsius. In this case, temperature of an outer surface of the rotisserie grill body 1 is not greater than 70 degrees Celsius, which sufficiently satisfies a requirement of relevant EU regulations and specifications for the cold surface temperature.

In the present embodiment, by providing three separate air cavities, the hot air passage 300, the cold air duct 400, and the heat insulation cavity 500, the high-temperature air lost from the heating cavity 100 is returned to the heating cavity 100 to avoid waste of heat energy, save energy, and prevent the rotisserie grill body 1 from overheat. The heat conducted to the outside of the rotisserie grill body 1 is radiated to the outside through the cold air duct 400, thereby reducing the temperature of the outer surface of the rotisserie grill body 1 to satisfy the relevant specifications for temperature control of the outer surface and the cold surface. The heat insulation cavity 500 isolates the high-temperature air and low-temperature air of the hot air passage 300 and the cold air duct 400, and performs a multi-level gradient heat insulation treatment to achieve cold and hot diversion, and further prevents heat transfer between a cold end and a hot end, enhances effects of heat energy return and surface temperature dissipation, and helps reducing the temperature of the outermost cold surface. With different combinations of the spit rod 8, the grill 9, a bakeware 5, and a cover door 7, it is possible to cook a variety of foods in a plurality of modes. Therefore, the invention has good heat insulation effect, high heating efficiency, energy saving and low cold surface temperature. Of course, the present invention can also remove the heat insulation cavity 500 so that only the two separated air cavities of the hot air passage 300 and the cold air duct 400 are left, which can also achieve an effect of cold and heat diversion with effect inferior to that in the case of three air cavities.

Second Embodiment

Figure 6:
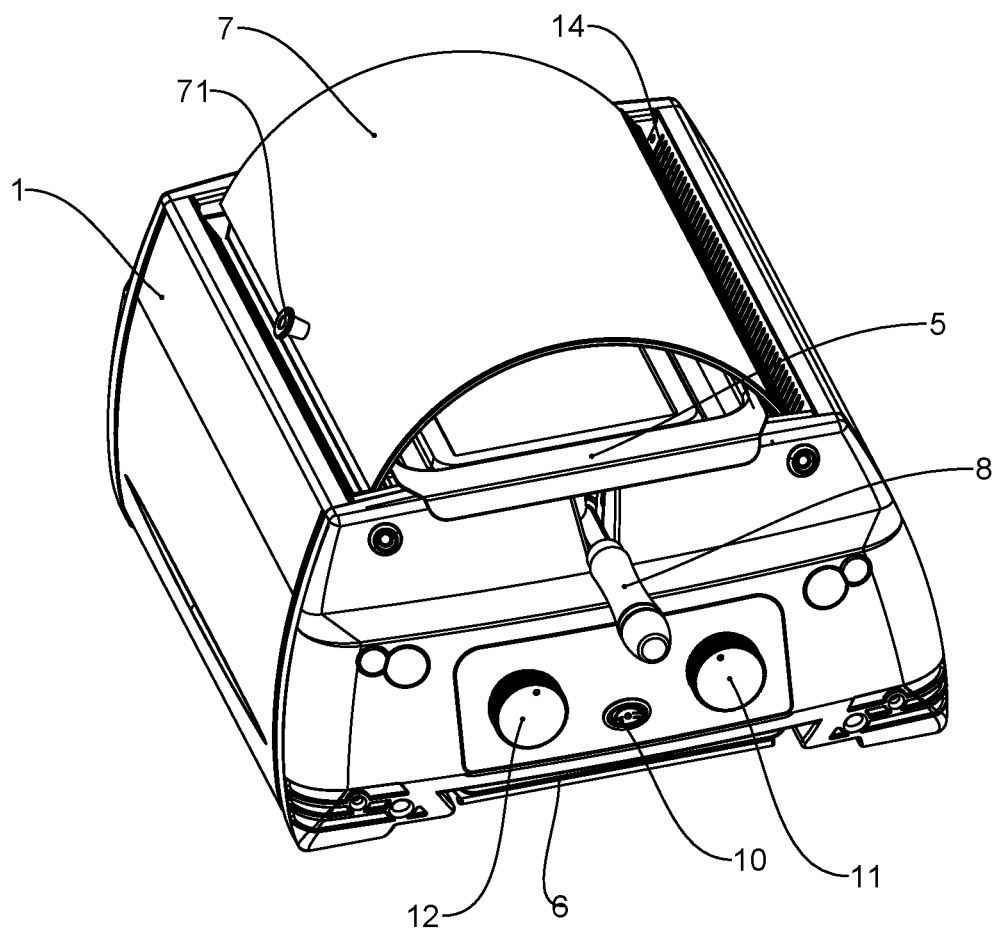
FIG. 6 is a schematic view of an overall structure of a second embodiment of the present invention.
Figure 7:
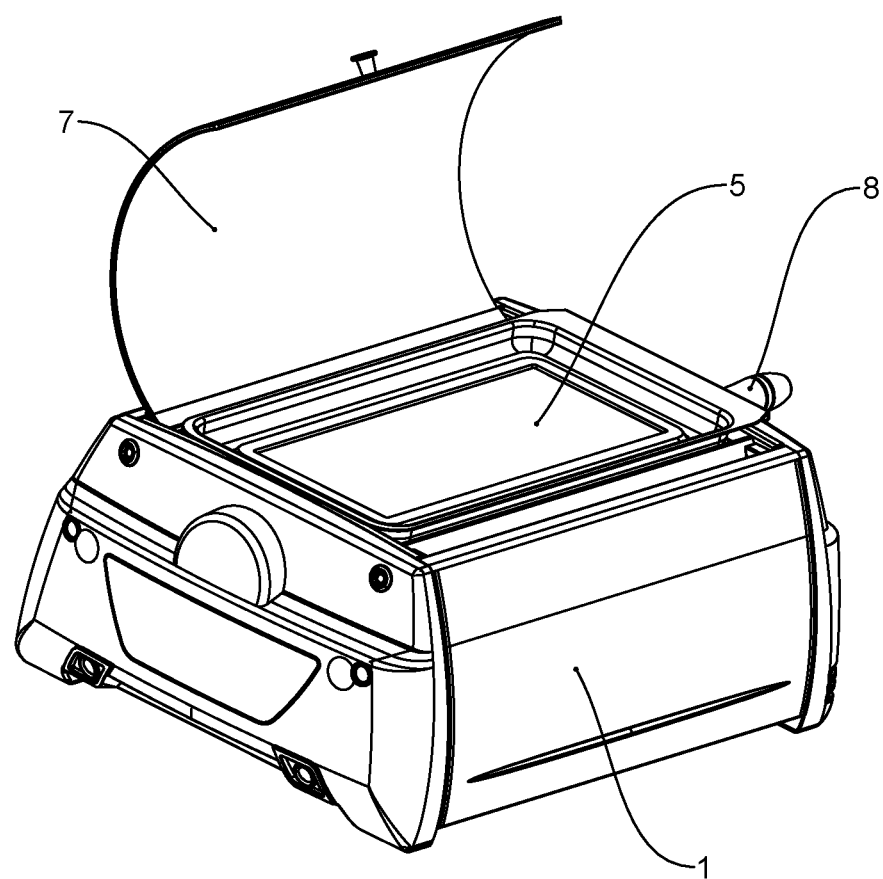
FIG. 7 is a schematic view of a structure in an open state of a cover door of the second embodiment of the present invention.
Figure 8:
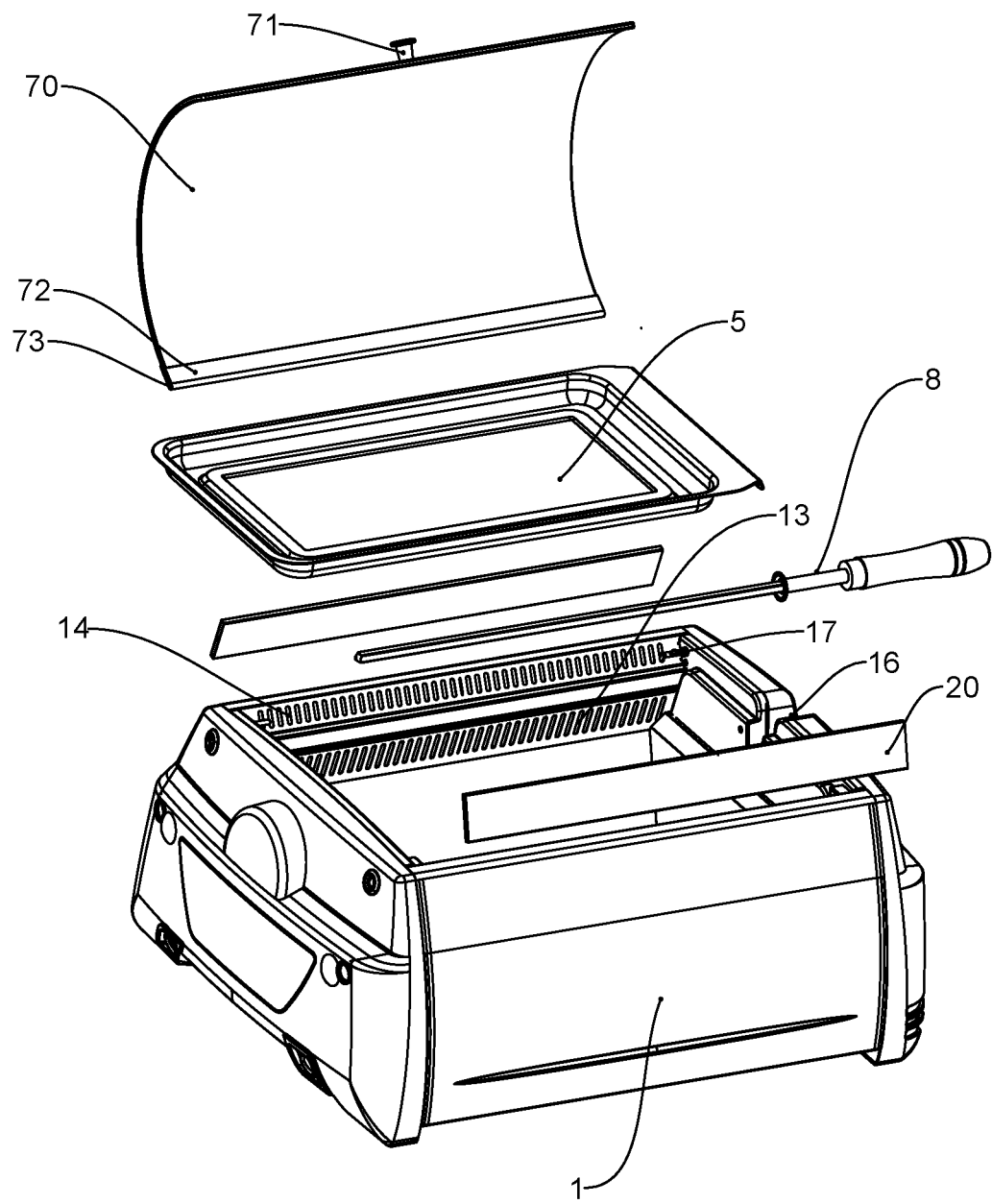
FIG. 8 is a schematic view of an exploded structure of the second embodiment of the present invention.
Figure 9:
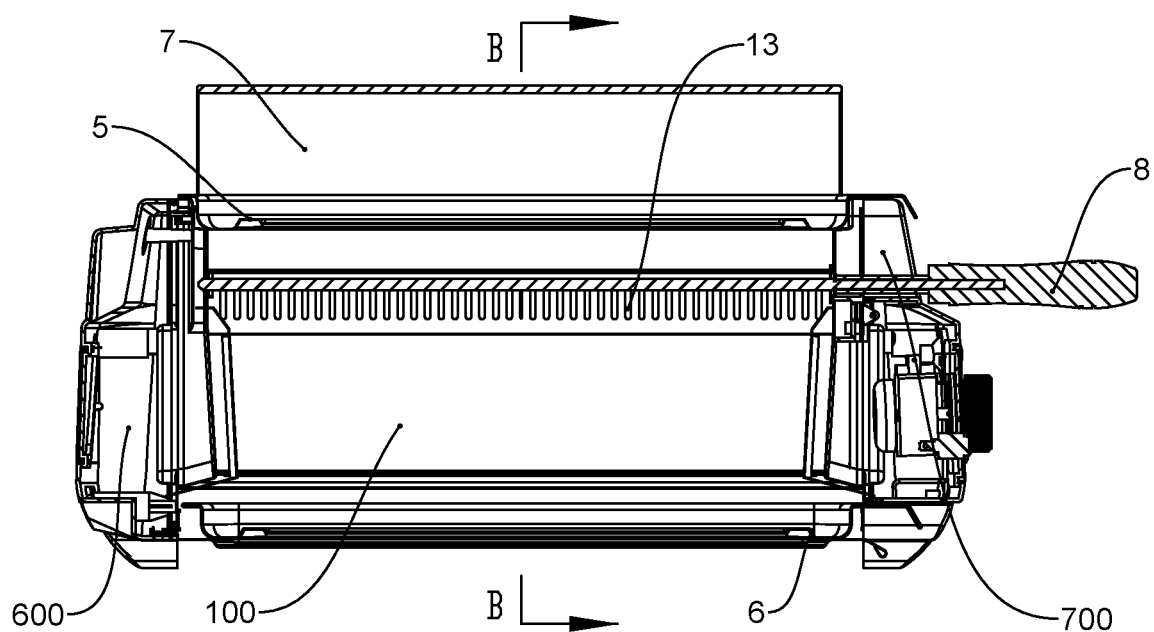
FIG. 9 is a schematic view of a vertical cross-sectional structure of the second embodiment of the present invention.
Figure 10:
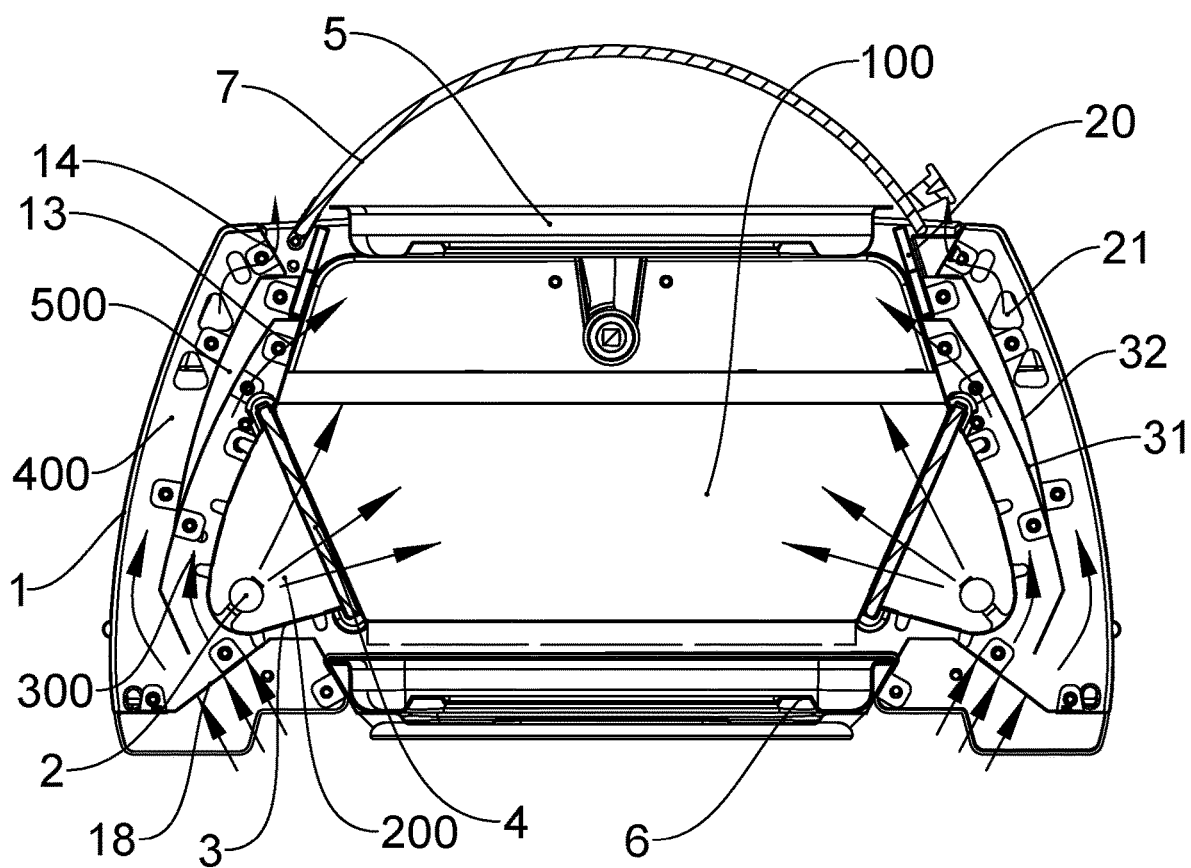
FIG. 10 is a schematic view of a cross-sectional structure along B-B shown in FIG. 9.

As shown in FIGS. 6 to 10, a rotisserie grill in the present embodiment is different from that in the first embodiment in the following points. In the present embodiment, the grill 9 in the first embodiment is removed. The rotisserie grill in the present embodiment further includes the cover door 7. The cover door 7 includes a glass cover 70 and a bead 72 fixed on one side of the glass cover 70. Both ends of the bead 72 are provided with a shaft hole 73. A pair of door shafts 17 face each other at two ends of the top portion of the rotisserie grill body 1. The shaft hole 73 is matched and connected with the door shaft 17. When the cover door 7 is closed, a top portion of the heating cavity 100 is closed to prevent direct heat loss. The rotisserie grill further includes the bakeware 5. The bakeware 5 can be disposed on the top portion of the heating cavity 100 to close the heating cavity 100 to cook the food on the bakeware. Various kinds of cooking operations such as roasting, frying, stirring, steaming, and boiling can be carried out on a variety of meat and vegetables. The rotisserie grill further includes two baffles 20. The baffles 20 are detachably arranged vertically at positions between the backflow holes 13 and the exhaust holes 14 on the rotisserie grill body 1, so that when the cover door 7 is closed, two sides of the cover door 7 and the heating cavity 100 are closed. The cover door 7 includes a handle 71. The cover door 7 is arched. Furthermore, in the present embodiment, the heat insulation cavity 500 is filled with heat insulation wool to further enhance the heat insulation effect. Of course, the cavity can also be filled with other insulation materials.

The remaining features of the present embodiment are the same as those in the first embodiment.

In the present embodiment, by arranging the reflecting plates 3 and the spit rod 8 in the heating cavity 100, the reflecting plates 3 directly reflect the heat of the heating tubes 2 to the food on the spit rod 8, and thus the heat can be focused, the heating efficiency is high, the waste of the heat energy is avoided, the energy is saved, and the function of automatically rotating and roasting in the heating cavity is implemented. Therefore, the present invention has advantages of high heating efficiency and energy saving, and can roast food in the automatic rotating mode.

The present invention can be widely used in a field of food processing.

What is claimed is:
1. A rotisserie grill comprising:
a rotisserie grill body (1);
an electric controller;
a spit rod (8); and
a motor,
wherein the rotisserie grill body (1) defines a heating cavity (100) having an upper opening,
wherein the heating cavity (100) is provided with, at a bottom portion thereof, a detachable residue receiving tray (6),
wherein the heating cavity (100) is provided with, on both sides thereof, a pair of vertically arranged heating tubes (2) and a pair of reflecting plates (3) that reflect heat from the heating tubes (2) into the heating cavity (100),
wherein the rotisserie grill body (1) has a plurality of air intake holes (18) at a bottom portion thereof, the plurality of air intake holes (18) leading into a cavity between vertical inner and outer plates of the rotisserie grill body (1),
wherein the spit rod (8) includes an inserting rod (80), a handle (81), and a positioning piece (82),
wherein the rotisserie grill body (1) is provided with a quick connector (18) on an inner plate at a front end, and a groove (16) on each of inner and outer plates at a rear end, a front end of the inserting rod is detachably connected to an output end of the motor via the quick connector (18), a rear end of the inserting rod is connected to the handle (81) and overlaps with the groove (16),
wherein the positioning piece (82) and the handle (81) are respectively located on two sides of the inner and outer plates at the rear end of the rotisserie grill body (1) to axially limit the inserting rod (80),
wherein the motor drives the inserting rod (8) and food thereon to rotate, and the reflecting plates (3) directly reflect the heat of the heating tubes (2) and direct the efficiency roasting mode;
wherein the cavity between the vertical inner and outer plates of the rotisserie grill body (1) includes a hot air passage (300) close to the heating cavity (100) and the reflecting plate (3), and a cold air duct (400) close to an outer wall of the rotisserie grill body (1), wherein the hot air passage (300) has a plurality of backflow holes (13) on a top portion, the plurality of backflow holes (13) communicating with the heating cavity (100) so that high-temperature air in the hot air passage (300) flows back into the heating cavity (100), and the cold air duct (400) has a plurality of exhaust holes (14) on a top portion, the plurality of exhaust holes (14) communicating with outside to discharge low-temperature air in the cold air duct (400) and reduce temperature of the outer wall of the rotisserie grill body (1);

wherein a heat insulation cavity (500) is further provided between the hot air passage (300) and the cold air duct (400), the heat insulation cavity (500) isolates the high-temperature air and the low-temperature air of the hot air passage (300) and the cold air duct (400), and the heat insulation cavity (500) is a closed cavity.

2. The rotisserie grill according to claim 1, wherein a front cavity (600) and a rear cavity (700) are respectively provided between inner and outer plates at front and rear ends of the rotisserie grill body (1) to thermally isolate the front and rear ends of the heating cavity (100) from outside.

3. The rotisserie grill according to claim 2, wherein both ends of the rotisserie grill body (1) that corresponds to the cold air duct (400), so that the front cavity (600) and the rear cavity (700) are communicated with the cold air duct (400).

4. The rotisserie grill according to claim 1, wherein the reflecting plate (3) is provided with a transparent glass cover plate (4) at the opening to close the reflecting plate (3) and obtain a reflecting cavity (200).

5. The rotisserie grill according to claim 1, further comprising: a grill (9), wherein the grill (9) is provided with mesh holes, and a handle (91) at both ends, the rotisserie grill body (1) is provided with a foot pad (15) at four corners, and the grill (9) is configured to be disposed on the foot pads (15) to roast food on the grill (9).

6. The rotisserie grill according to claim 1, further comprising: a cover door (7), wherein the cover door (7) includes a glass cover (70) and a bead (72) fixed on one side of the glass cover (70), wherein both ends of the bead (72) are provided with a shaft hole (73), wherein a pair of door shafts (17) face each other at two ends of a top portion of the rotisserie grill body (1), wherein the shaft hole (73) is matched and connected with the door shaft (17), and when the cover door (7) is closed, a top portion of the heating cavity (100) is closed to prevent direct heat loss.

7. The rotisserie grill according to claim 6, further comprising: a bakeware (5), wherein the bakeware (5) is configured to be disposed on a top portion of the heating cavity (100) to close the heating cavity (100) to cook food on the bakeware (5).

8. The rotisserie grill according to claim 7, further comprising: two baffles (20), wherein the baffles (20) are detachably arranged vertically at positions between the backflow holes (13) and the exhaust holes (14) on the rotisserie grill body (1) so that when the cover door (7) is closed, two sides of the cover door (7) and the heating cavity (100) are closed, wherein the cover door (7) includes a handle (71), and the cover door (7) is arched.

\* \* \* \* \*